United States Patent [15] 3,651,687
Dory [45] Mar. 28, 1972

[54] ULTRASONIC MICROMETER

[72] Inventor: Jacques Dory, Meaux, France
[73] Assignee: Corporation "Realisations Ultrasoniques"
[22] Filed: July 9, 1968
[21] Appl. No.: 743,415

Related U.S. Application Data

[63] Continuation-in-part of Ser. No. 495,463, Oct. 13, 1965, Pat. No. 3,431,774, Continuation-in-part of Ser. No. 508,348, Nov. 17, 1965, Pat. No. 3,423,992, Continuation-in-part of Ser. No. 678,929, Oct. 30, 1967, Pat. No. 3,454,922.

[30] Foreign Application Priority Data

July 10, 1967 France..................113738

[52] U.S. Cl. ...........................73/67.8 R, 73/71.5
[51] Int. Cl. ..........................................G01n 29/00
[58] Field of Search ................73/67.5, 67.6, 67.7, 67.8, 73/67.9, 71.4

[56] References Cited

UNITED STATES PATENTS

| | | | |
|---|---|---|---|
| 2,985,018 | 5/1961 | Williams | 73/67.5 X |
| 3,209,591 | 10/1965 | Lester | 73/67.5 X |
| 3,287,963 | 11/1966 | Stanya et al. | 73/67.9 |
| 3,379,051 | 4/1968 | Zeutschel et al. | 73/67.5 X |
| 3,427,866 | 2/1969 | Weighart | 73/67.7 |
| 2,995,926 | 8/1961 | Dory | 73/67.8 |
| 3,394,585 | 7/1968 | Davey | 73/67.7 |
| 3,404,551 | 10/1968 | Spisak | 73/67.5 X |

FOREIGN PATENTS OR APPLICATIONS

| | | | |
|---|---|---|---|
| 941,573 | 10/1963 | Great Britain | 73/67.8 |
| 1,089,742 | 11/1967 | Great Britain | 73/67.8 |
| 180,393 | 11/1965 | U.S.S.R. | 73/67.5 |

OTHER PUBLICATIONS

Goldman; R., Ultrasonic Technology, Reinhold Pub. Co., N. Y., 1962, pp. 62.
Smith; R. T., " Stress Induced Anisotrophy in Solids," Ultrasonics, July–Sept. 1963, Vol. 1– 2, 1963– 1964, pp. 138– 139.
Goldman; R., Ultrasonic Technology, Reinhold Publishing Co., N. Y., 1962, pp. 71– 78.

Primary Examiner—Richard C. Queisser
Assistant Examiner—Arthur E. Korkosz
Attorney—William Anthony Drucker

[57] ABSTRACT

The invention generally relates to the method of measurement of distances through reflexion of ultrasonic pulses on a reflecting surface and determination of the time interval of propogation of the resulting echoes from the reflecting surface to the transducer.

The instant invention more particularly discloses a micro method based on said method and including means for focusing the ultrasonic pulsed ways at an accurately predetermined point on the reflecting surface.

3 Claims, 12 Drawing Figures

ULTRASONIC MICROMETER

REFERENCE TO RELATED APPLICATIONS

This application is a continuation-in-part of copending applications,

Ser. No. 495,463 filed Oct. 13, 1965, now U.S. Pat. No. 3,431,774;

Ser. No. 508,348 filed Nov. 17, 1965, now U.S. Pat. No. 3,423,992;

Ser. No. 678,929 filed Oct. 30, 1967, now U.S. Pat. No. 3,454,922.

Dial indicators or micrometers used conventionally for the measurement and checking of the dimensional characteristics of mechanical parts employ Borda's method: the indicator is set to zero when the standard is inserted into the balanced measuring line, and it is then replaced, in said line, by the part to be measured, so that the indicator gives the deviation value between the part and the standard.

These devices are mechanical and most often comprise a fixed anvil supporting the parts and a test probe which is contacted with the part in order to carry out the measurement.

The precision of these devices can be as much as one one-hundreth mm. provided the reaction of the test probe on the part is not too great (otherwise the difference in deflection due to the difference in weight between the standard and the part leads to a source of error) and that the measurement stress exerted on the test probe does not undergo unduly high fluctuations. When a moving or rapidly vibrating part is to be checked, they become difficult to use because of their inertia. Generally, numerous problems arise in use: as an example, the problem of equating the temperatures of the standard and the part to be measured and the problem of return, in the case of bore measurements.

Present day techniques for dimensional measurements further employ pneumatic or electrical systems.

However, pneumatic systems have a relatively large inertia and a reduced measurement range while electrical devices (such as capacitive or mutual induction gauges) are linear on a short distance range only, their indications, furthermore, depending on the nature of the walls, which, in certain cases, must be plated.

As far as vibrating system measurements are concerned acceleration meters are used in addition to the previously mentioned devices. These instruments have the disadvantage of requiring an intimate contact with the vibrating component whose operation may thus be disturbed.

In general, the fields of application of each of the devices referred to above are relatively limited, which makes it necessary to have several classes of instruments available if various measurement problems are to be solved.

Furthermore, the present day trend is to use, in measuring lines, detectors producting anamorphosis, i.e., the conversion of the quantity to be measured into an electrical quantity, the latter being advantageously in numerical form (electrical pulses).

It may be concluded, finally, that known devices for dimensional measurements are not provided with all the conveniences which should be expected in a modern instrument.

Accordingly, it is an object of the present invention to provide such an instrument through the application of the known principle whereby distances are measured by determining the go and return propagation time of pulses in a high frequency directional ultrasonic beam reflected by a surface of the medium to be controlled, so as to measure with a high precision, the position or displacement of a surface or a point in a surface, in a dynamic or static state.

Known distance measuring devices applying said principle are in no way adapted for use as a micrometer, which requires the measurement of a distance to be carried out without any mechanical contact with the part, at a distance, generally less than 10 cm., which can reach a lower limit of the order of 1 mm., and with a precision higher than $10^{-3}$ as a relative value, and ranging from one tenth mm. to 1 micron as an absolute value.

Indeed, the detector or probe unit of these devices comprises an electro-acoustical transducer generally designed and constructed so as to measure relatively large distances, and therefore, so as to transmit ultrasonic pulses at a relatively low rate.

Certain devices transmit ultrasonic pulses at a sufficiently high rate to allow measurements of a relatively small distance, but in that case, the transducer is in contact with the surface of the medium (solid or liquid, for example) of the mechanical part whose thickness, for example, is to be measured, which obviously facilitates the solution of the ultrasonic propagation problem between the transducer and the medium studied, but is not suitable for the construction of a micrometer.

It should be mentioned, in addition, that the known devices referred to above, do not make it possible to localize, with precision, the ultrasonic impact zone on the surface to be controlled.

It is another object of the invention to provide a distance measuring device through reflection of ultrasonic pulses, especially designed and constructed to be used as a micrometer, and, to this effect, capable of focusing an ultrasonic beam at a well-determined point of the surface to be controlled and of carrying out a precise measurement of a small distance in air.

According to a preferred embodiment of the invention, the probe unit comprising such a device essentially consists of an active blade made of a piezo-electric material, inserted between a block of a substance having a high damping coefficient with respect to ultrasonic pulses generated by said blade and of a blade, consisting of a substance having low absorption characteristics, whose thickness is, preferably, equal to a quarter of the wave length and of a spherical surface which comprises the transducer emission surface, and possesses a curvature such that the ultrasonic beam emitted at a distance of several millimeters may be focused.

The damping block makes it possible for the transducer thus constituted to generate pulse trains of very brief duration (for example, several micro-seconds), and whose recurrence frequency can, as a result, be very high, while the matching of acoustical impedances obtained by the blade at a quarter of a wave makes it possible to collect echoes of sufficient amplitude to make them useful for the receiver comprising the device, in spite of the fact that the propagation takes place in air, and, due to the damping necessary to obtain pulse trains of very brief duration, by using a very low acoustical energy.

Ultrasonic beam focusing makes it possible to localize precisely a point on the surface of the part where the control is being effected. According to a preferred embodiment of the invention, two light sources, arranged symmetrically with respect to the transducer and associated with an appropriate optical system, direct two beams towards said point which converge on the ultrasonic beam focusing point.

Other particularities, as well as various advantages of the invention, will appear more clearly as a result of the following description.

Figure 1:
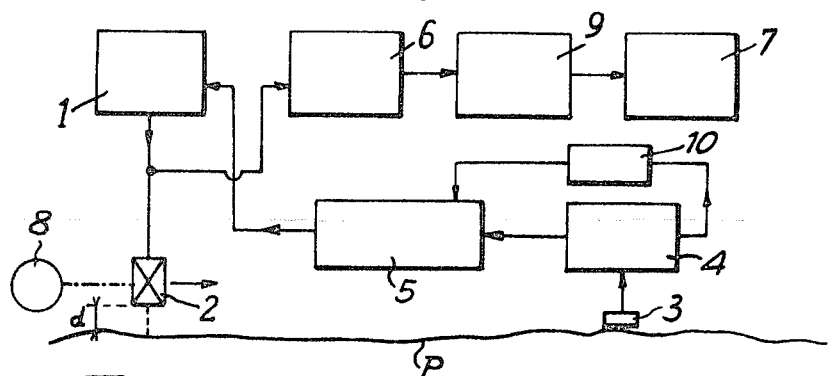
FIG. 1 is a schematic diagram of an ultrasonic micrometer capable of effecting static as well as dynamic measurements.

The device shown in FIG. 1 comprises an electric pulse generator 1 of a general type known per se, actuating an electro-acoustical transducer 2. Generator 1 comprises a high frequency oscillator (advantageously ranging from 1 to 3 MHz) and means for chopping the high frequency oscillation into pulses of brief duration (advantageously of the order of several micro-seconds).

As will be explained later, the emission times of these pulses can be synchronized, with a lag which may be adjusted with respect to time, with the vibration of part P to be controlled, when a study of the vibrating part is to be made. This result is obtained by means of a fixed detector 3 which may comprise a single microphone placed in the immediate vicinity of the vibrating surface, an electrostatic detector, or any other appropriate means.

The electric oscillation generated by detector 3 is amplified by an amplifier 4 and phase-shifted by a phase-shifter 5, in which a counter 10 causes the phase-shifting to vary before synchronizing, in a manner known per se, the transmission of impulses by generator 1.

Transducer 2 converts these electric pulses into acoustical pulses which are reflected from surface P. The echoes are converted by the transducer into amplified electric signals and are detected by a receiver 6 of a known type.

A measuring device 7, known per se, is connected to the output of the receiver and may be either of the analog or numerical type.

In the first case, it delivers a continuous voltage which is proportional to the time elapsed between the emitted pulse and the echo, and in the second case comprises an electronic counter which measures this time by counting pulses having a fixed rhythm provided by a time base.

In both cases, a measurement of distance $d$ (FIG. 1) is obtained, the result of the measurement being either recorded or displayed in a continuous manner, which makes it possible to obtain a continuous indication of dimensions and to record tolerances.

Devices 1, 6 and 7 are advantageously provided with improvements which are the subject of French Patent applications filed by the applicant on Nov. 25, 1964, for: "Device for measuring thickness and distance by means of ultrasonic pulses" (hereafter referred to as: "first application") on Feb. 8, 1966, for: "Process and device for digital measurement of distances by means of ultrasonic pulses" (hereafter referred to as: "second application") on Feb. 10, 1966, for: "Process and device for analog measurement of distances by means of ultrasonic pulses" (hereafter referred to as: "third application") and on Nov. 8, 1966, for: "Apparatus for measuring levels by reflection of ultrasonic pulses" (hereafter referred to as: "fourth application").

The device described in the first application is designed to eliminate errors in measurement due to the disappearance of the echo, as a result, for example, of a turbulence in the air space $d$ crossed by the ultrasonic beam.

It can generally be replaced, within the scope of this invention, by a simpler device of the "anti-fading" type.

The devices which are the subject of the second and third applications are designed to eliminate errors in measurement due to a change in propagation characteristics, for example, due to a variation in temperature. It is fundamental, in an acoustical micrometer, to provide for such a device, or an equivalent device due to the precision of measurement desired.

The device described in the fourth application is designed to correct errors due to the imperfect form of the echoes. It is generally preferable to provide such a device in an acoustical micrometer even though, because distance $d$ is small, this source of error is relatively insignificant.

Figure 2:
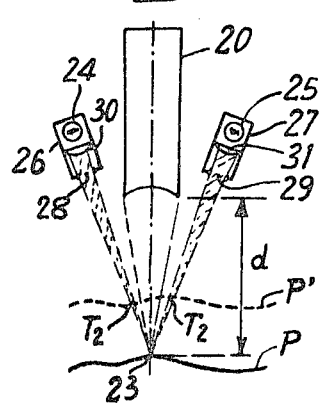
FIG. 2 is a diagram of the probe unit comprising such a micrometer.
Figure 3:
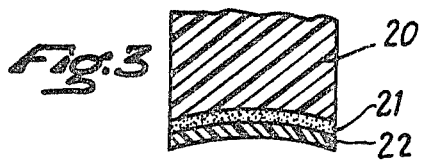
FIG. 3 is a section of the active part of the transducer.
Figure 7:
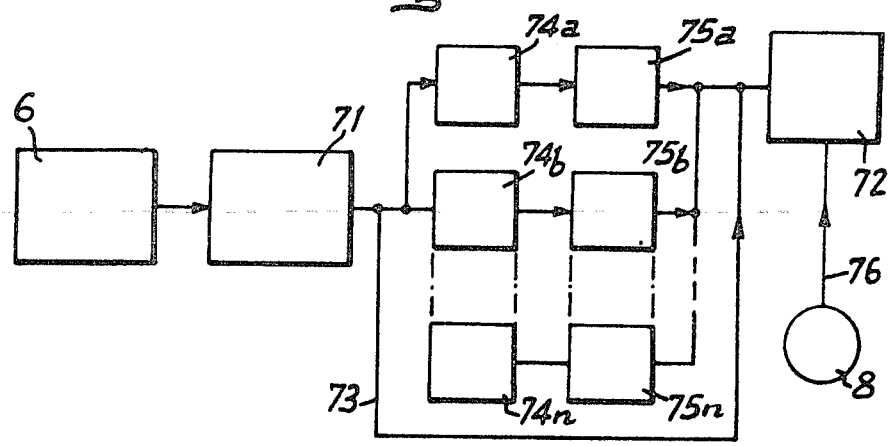
FIG. 7 is a diagram of a device to be used in recording level curves.

Transducer 2 is preferably of the type shown in FIGS. 2 and 3.

As shown by the longitudinal section in FIG. 3, in which the relative thickness of layers 21 and 22 has been exaggerated for purposes of clarity, the active component comprises a blade 21, advantageously made of a piezo-electric ceramic material, covered by a blade 22 made, for example, of plastic material with an appropriate thickness to enable it to act as a quarter wave blade. These two blades are externally concave, so as to focus the ultrasonic beam emitted at an appropriate distance $d$. The transducer should of course be changed when modifying this distance, depending on the required application.

Blades 21 and 22 are glued to a suitable loaded block made of plastic material 20 which acts as a damper of acoustical vibrations: thanks to the presence of this block, the transducer converts a brief electrical pulse into a single acoustical pulse of the same profile. It is important, indeed, in the application of the micrometer, that the generated acoustical pulse be very brief and not be followed by a train of interfering oscillations which might hinder the reception of echoes — the latter having a very small amplitude and being received by a transducer a vary short time after the emitted pulse provoking them.

Blade 22 improves acoustical coupling between the acoustical vibration generating component 21 and the air in which the ultrasonic pulses are to propagate. Insertion loss due to the difference in acoustical impedance existing between the air and the active component is thus reduced. In practice, this reduction of insertion loss is indispensable in the construction of an acoustical micrometer. Indeed, because the transducer must be highly damped, for reasons that have just been stated, a large part of the acoustical energy generated by the active component is dissipated in block 20. But the relatively weak acoustical energy available must give rise to an available echo in spite of its propagation in air, i.e., in a medium with unfavorable propagation characteristics.

It must be well understood that acoustical matching and damping problems, which are particularly difficult in the construction of a micrometer, may have other solutions than the one described, for example, the use of a highly coherent acoustical source, comprising several layers of materials having very low acoustical impedances, or a progressively variable impedance.

The solution described has the advantage of being both simple and efficient.

The curvature of the emitting surface (external surface of blade 22) is determined so as to produce a focused beam having a section less than 1 mm.$^2$ from the level of the focal spot 23 (FIG. 2).

An optical device, drawn as two light sources comprising lamps 24–25 respectively contained in opaque tubes 26–27 provided with openings 28–29 and associated with respective condensers 30–31, generates two light beams whose focal spots coincide with focal spot 23. This device makes it possible to set the detector at the correct distance. Indeed, as long as surface P, placed at P', for example, cuts the ultrasonic beam outside its focal point, two light spots $T_1$, $T_2$ can be observed which are set off with respect to one another. The detector must therefore be displaced in a direction perpendicular to surface P until these two light spots coincide.

It is evident that this precise setting of the sounding point on the focal spot of a well focused ultrasonic beam is particularly important when, in a study of a vibrating system, the localization of very closely spaced vibration nodes and antinodes is to be detected.

Such a setting is, however, valuable even when effecting a purely static control: it improves the localization of the point whose value was measured and, in addition, makes it possible to reflect a larger fraction of the acoustical energy emitted towards the detector.

The displacement of the detector so as to set it into position and scan surface P is carried out, either by hand, or by means of an automatic device 8 (FIG. 1). A filter 9 has been inserted between amplifier 6 and measuring device 7 so as to eliminate the various unnecessary components of the signal received, as will be explained later FIG. 4 shows a particularly advantageous embodiment of phase-shifter 5.

A transistor 32, polarized by a source of continuous voltage through resistors 33–34–35, receives on its face, the output signal of amplifier 4. A variable capacity diode 36 and a resistor 37 connected in series are connected in parallel on resistors 33–34 connected in series. The common point to diode 36 and resistor 37 is connected to device 1. Counter 10 applies a voltage to the terminals of diode 36, through a transformer 38.

Counter 10 has an analog output, i.e., the voltage which it generates increases in a stairway manner by equal amplitudes up to the level corresponding to the maximum capacity of the counter and is then returned to zero, after which it begins to increase again, each step in the stairway corresponding to a period of the vibration detected by detector 3.

Figure 4:
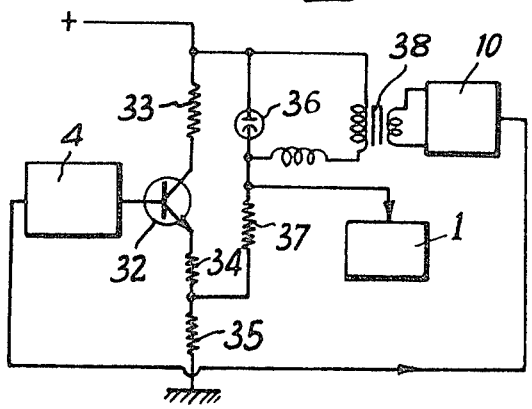
FIG. 4 is a phase-shifting device used in the apparatus of FIG. 1.

However, the phase-shift provoked by the device of FIG. 4 in said vibration is proportional to the voltage applied to the terminals of the variable capacitor diode. This phase-shift therefore, increases by a well determined quantity from one period to the next.

Figure 5:
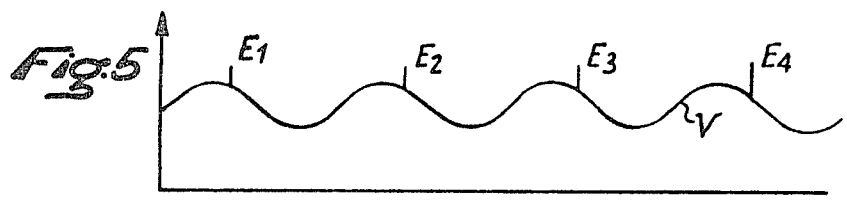
FIGS. 5 and 6 illustrate the operation of the device of FIG. 1, when applied to the study of a vibration.

This results finally in the impulse emitted by generator 1 being phase-shifted in a regularly increasing manner with respect to vibration V, as shown by the wave forms in FIG. 5, which shows the positions of several emitted successive impulses $E_1$, $E_2$ etc. Phase shifting has been exaggerated, to make it clearer. In reality, the phase shifter is adjusted so that the pulse will scan a complete period of the vibration, for example, in 50 emissions.

The time interval separating the emission of each pulse from the reception of the corresponding echo is proportional to distance $d$ at the instant of emission, the variation of this distance being equal to the amplitude of the vibration at the instant of emission. This variation has, of course, in the example under consideration, a period equal to 50 times the period of vibration.

Filter 9 will therefore have to be arranged so as to cut out this relatively low stroboscopic modulation frequency. It will also have to cut out the emission frequency of pulses $E_1$; $E_2$ etc; the continuous component of the signal shown in FIG. 5 will also be cut out.

It should be observed that the rate of analysis of a vibration, using this procedure, is relatively slow.

Figure 6:
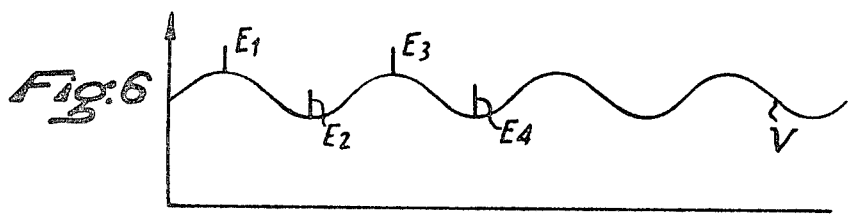

In a varying embodiment of the device, it is possible to have the amplifier 4 (FIG. 1) function as a frequency doubler, and to regulate the phase-shift provided by device 5 by means of a manuel control, so as to obtain the coincidence of pulses $E_1$, $E_2$, etc. with the peaks of vibration V (FIG. 6) this coincidence being detected by the fact that the output signal of amplifier 6 will then have its maximum amplitude.

In this variation, device 7 will have to be arranged so as to measure the peak amplitude of the vibration The output voltage of amplifier 6 is, in this variation, much easier to filter, and the rate of analysis is more rapid. In the case where the vibration frequency is not higher than a few dozen hertz, the transmitter synchronization device, consisting of phase-shifter 5 and components 3–4–10 of FIG. 1, can be disconnected, device 7 then supplying several values (approximately 50, for example) of the vibration amplitude for each of its periods. Indeed, it is not necessary, in this case, to use a stroboscopic method, for there is then no difficulty in using a pulse recurrence frequency, for example, 50 times higher than the vibration frequency : such a recurrence frequency can have, for example, for a 50 Hz. vibration frequency, a value of 2.5 kHz., i.e., a time of one twenty-five hundredths second will be available, which is a very sufficient transmitting time, to allow damping of interfering echoes between two successive pulses.

On the other hand, in the case where the vibration frequency to be studied reaches, for example, several kHz., the application of this simple method is practically impossible, due to the fact that the maximum pulse frequency that may be used is limited by the fact that it is necessary to wait, in order to transmit a new pulse, that the interfering echoes originating from the preceding pulse be damped. The complete device of FIG. 1 must then be used, in one of the two ways described above.

7, shows one embodiment of measuring device 7 of FIG. 1, in the case where the latter is to be used for recording level curves defining the stationary wave system of a vibrating part. Amplifier 6 in FIG. 1 actuates a vibration peak amplitude detector 71, which is connected to a recorder 72, on the one hand, directly (conductor 73), and on the other hand, through threshold trigger circuits $74a$, $74b$, ... $74n$ followed by shunting circuits $75a$, $75b$,... $75n$.

Each of the trigger circuits $74a$, $74b$... $74n$ transmits a calibrated gating pulse to the corresponding shunting circuit whenever the vibration peak amplitude reaches the threshold for which it was set, the respective trigger circuit thresholds being increasingly larger so as to define different levels. The shunting circuit thus provides a pulse to recorder 72, which is arranged so as to mark a point at each pulse. The writing member of this recorder moves in synchronism with the scanning effected by the probe, of the vibrating surface (connection 76). Level curves are thus obtained, which contrast on a graduated background, which is provided by the direct permanent actuation of the recorder by the detected signal (connection 73).

A description is given above, in particular, for the use of the device of FIG. 1 for the analysis of a vibration. It may also be used for static measurements for example, the measurement of dimensions of parts in the process of being worked. Phase-shifting circuits 3–4–5–10 may then be disconnected. On the other hand, in this case, it will be necessary to provide the device with various additional circuits, some of which will be described later. In particular, the device may comprise several acoustical probes having well defined positions and means for switching them onto the transmitting-receiving and measurement circuit so as to compare various dimensions with one another.

Figure 8:
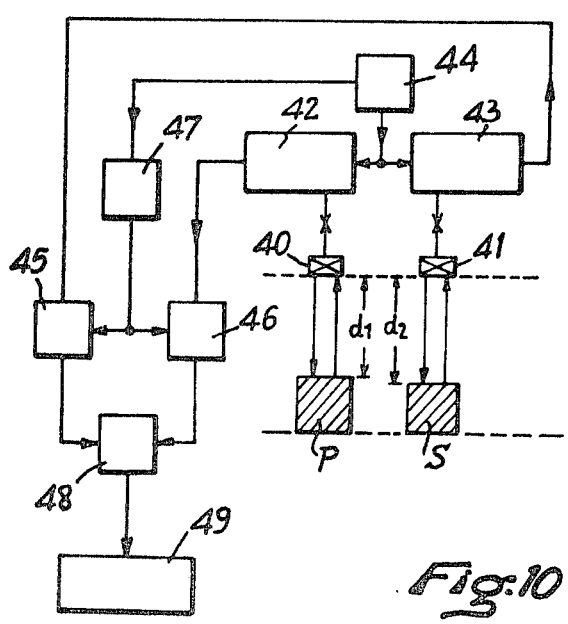
FIG. 8 is a schematic representation of an acoustical micrometer for carrying out differential measurements.

When it is desired to take precise dimensional measurements with respect to a reference standard, the differential assembly shown in FIG. 8 is advantageously used.

This assembly comprises two transducers 40 and 41 respectively connected to two transmitting-receiving electronic devices 42–43.

The pulse transmitters comprising these devices are synchronized by a common clock generator 44, while their receiver outputs are respectively connected to two gates 45 and 46. These gates are controlled by a flip-flop 47, itself tripped by clock generator 44, and they actuate a flip-flop 48. The signals originating from flip-flop 48 are applied to a recording or measurement device 49, which is advantageously a counter of the digital type fed with recurrent pulses generated by a clock and transmitted through a gate for the duration of the signals ($f$).

Figure 9:
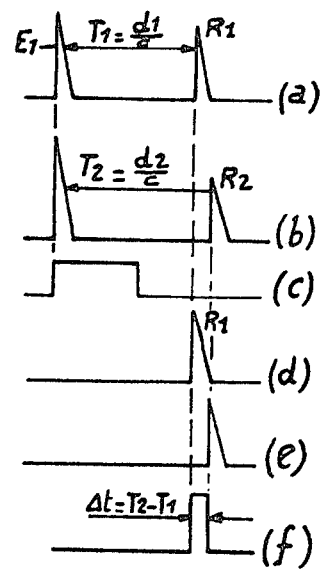
FIG. 9 shows wave forms at different points of the device in FIG. 8.

FIG. 9 shows the wave forms at different points of the assembly:
 at ($a$), the signal originating from receiver 43
 at ($b$), the signal originating from receiver 42
 at ($c$), the signal originating from flip-flop 47
 at ($d$), the signal originating from gate 45
 at ($e$), the signal originating from gate 46
 at ($f$), the signal originating from flip-flop 48

The assembly shown in FIG. 5 functions as follows:

Acoustical probes 40 and 41 are supported so that their transmitting surfaces are rigorously in the same plane, parallel to the support of standard S of part P.

The first echo R provided by probe 41 is separated from the corresponding transmission pulse $E_1$ by a time interval $T_1 = d_1/c$, $c$ being the speed of ultrasonic propagation in air, while the first echo $R_2$ provided by probe 40 is separated from the corresponding transmission pulse $E_2$ by a time interval $T_2 = d_2/c$.

Gates 45 and 46 transmit output signals from devices 43 and 42 to flip-flop 48 only outside the time intervals defined by the gating pulse, having wave form ($c$), FIG. 9, which is applied to them by flip-flop 47. In this way, only echoes $R_1$ and $R_2$ are transmitted, as can be seen at (d) and (e), FIG. 9, exclusive of transmission pulses and interfering signals which may follow the latter.

Flip-flop 48 is switched into state 1 by the leading edge of $R_1$, and restored to state 0 by the leading edge of $R_2$, so that it generates pulse (f) of width $\Delta t = T_2 - T_1 = 1/c \, (d_2 - d_1)$. Time $\Delta t$ is measured by device 49, which, therefore, indicates the difference $d_2 - d_1$ between the respective thicknesses of the part and standard.

Figure 10:
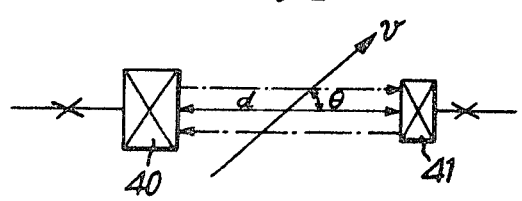
FIG. 10 illustrates the use of this apparatus for the measurement of a flow rate.

The assembly at FIG. 8 may be used for the measurement of the flow rate of a given liquid. Indeed, if both probes are immersed into the liquid, their transmitting faces being placed face to face at a distance d, as shown in FIG. 10, each one obviously receives the acoustical pulse emitted by the other, after this pulse has travelled a distance d, either in the direction of the current or counter-currently.

However, the speed of propagation of this pulse is, for one of the probes, $c - v \cos \theta$ and, for the other one, $c + v \cos \theta$, c being the speed of ultrasonic propagation in the resting liquid, v the speed of the liquid, and the angle included between the probe axis and this speed.

As a result, the width of pulse (f) originating from flip-flop 48 is:

$$\Delta t = d \, (1/c + v \cos\theta - 1/c - v \cos \theta)$$

This quantity, provided $v/c$ is sufficiently small, is approximately equal to $v \cos\theta \times 2d/c2$, and therefore provides a measure of $v \cos\theta$.

It should be noted that this method of acoustical measurement of a flow rate does not require a very precise setting of the two probes. This is not true for the known method which consists in using a first probe couple respectively transmitting and receiving, each one arranged opposite one another in the direction of the current and a second probe couple, respectively receiving and transmitting, each one similarly arranged opposite one another in the direction of the current. This known method, in practice, becomes unusable as soon as a relatively high degree of precision in measurement is required.

Figure 11:
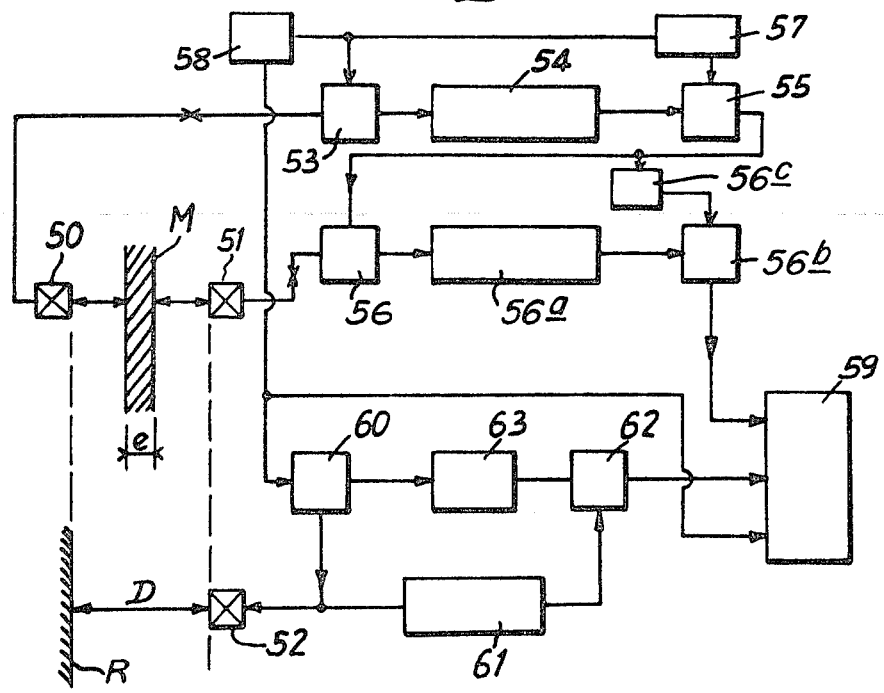
FIG. 11 is a diagram of an acoustical micrometer to be used in carrying out a precise measurement of thicknesses, and, FIG. 12 shows wave forms at different points of the apparatus of FIG. 11.

When a very small thickness is to be measured in particular, if the part under study is moving rapidly, it is advantageous, instead of using a conventional acoustical probe, to use the assembly of FIG. 11.

In this assembly, a probe couple, 50–51, is used to measure the sum of distances $D_1$ and $D_2$ respectively between their transmitting surfaces, each one arranged opposite one another in a parallel direction to the faces of part M, and said faces, while a third probe 52 measures distance D between its transmitting surface, distance D being equal to that separating probes 50–51.

Probe 50 is actuated by pulses ($E_1$, FIG. 9) provided by a transmitting-receiving device 53. Echoes $R_1$ generated by reflection of ultrasonic pulses from the surface of part M are transmitted to an amplifier 54, and then, through a gate 55, to a transmitting-receiving device 56. Pulses $E_2$ transmitted by the transmitter of device 56 are thus synchronized on $R_1$. Indeed, gate 55 is temporarily blocked by a gating pulse generated by a monostable unit 57, which is tripped by a synchronization generator 58, which also synchronizes the emission of pulses $E_1$. The duration of this gating pulse is such that gate 55 transmits echoes $R_1$; pulses $E_2$ actuate probe 51 and echoes $R_2$, generated by reflection of ultrasonic pulses from the surface of part M, are transmitted to an amplifier 56a and then, through a gate 56b to a measuring device 59. Gate 56b temporarily blocked by a monostable unit 56c tripped by echo R, originating from gate 55, and generating a gating pulse of a width such that gate 56b transmits $R_2$ and not $E_2$.

Figure 12:
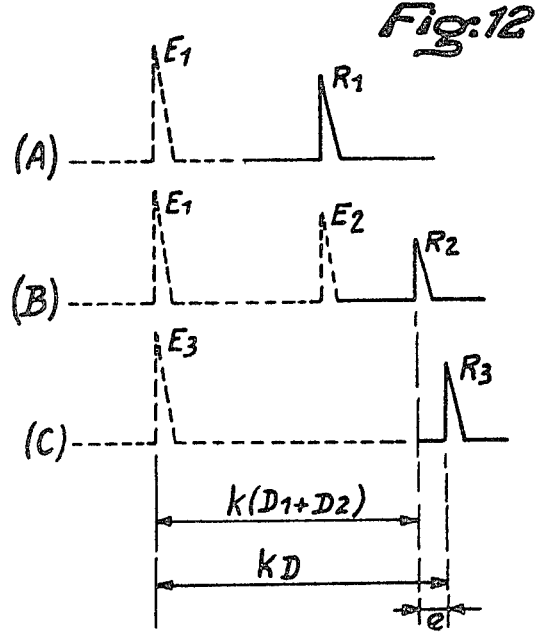

FIG. 12 shows, respectively at (A) and (B), the wave forms at the output of gates 55 and 56b.

Generator 58 synchronizes the emission of pulses $E_3$ through a third transmitting-receiving device 60, which actuates probe 52. Echoes $R_3$ generated by reflection of ultrasonic pulses on reference surface R (waveform C.), FIG. 12 are transmitted to measuring device 59, through an amplifier 61 and a gate 62. The latter is blocked for a sufficient time to avoid transmitting $E_3$, through a gating pulse generated by a mono-vibrator 63 tripped by $E_3$ and, to this effect, connected to device 60.

Generator 58 comprises a circuit connected to a zero resetting input of device 59.

Examination of FIG. 12 shows that time interval $E_3 R_2$ is equal to $k \, (D_1 + D_2)$, k being a constant, while time interval $E_3 R_3$ is equal to $kD$. Device 59 is arranged so as to indicate time interval $R_2R_3$, which is proportional to $D - (D_1 + D_2)$, i.e., to the thickness e of the part.

The device of FIG. 11 may be used to measure the internal diameter of a tube: in that case, both probes 50 and 51 will be coupled so as to be centered on a diameter of the tube, and probe 52 will not be put into operation. Device 59 will then measure time interval $E_1R_2$, which is proportional to the sum $D_1 + D_2$ of the distances of the free transmitting faces of the two probes to the two extremities of said diameter. In order to obtain the diameter of the tube, the total thickness of both coupled probes will have to be added to this sum. It is self-evident that various modifications may be introduced into the devices described and shown, without departing from the spirit of the invention.

What I claim is:

1. An apparatus for determining distances in a medium through reflection of ultrasonic pulses on a reflecting surface within said medium, said apparatus comprising transmitting means for transmitting an ultrasonic pulsed beam at an accurately predetermined point on said surface and receiver means for receiving echo pulses from said reflecting surfaces, said transmitting means including at least one transducer probe essentially consisting of a substantially spherical active layer made of piezo-electric material inserted between a block made of a substance having a substantial damping coefficient with respect to ultrasonic pulses generated by said active layer and a further quarter-wavelength ultrasound transmissive layer having a spherical concave surface, said concave surface forming a transmitting surface of the transducer and having a curvature adapted for focusing the said ultrasonic beam at a focal point located at a distance of a few millimeters from the said transmitting surface, said receiver means being connected to said transducer probe, said apparatus further comprising first and second units secured in symmetrical positions with respect to the transducer probe, each of said units comprising a light source and an optical system cooperating with said light sources for directing towards the said focal point, a light beam converging at the said focal point, whereby the two light beams and the ultrasonic pulsed beam converge at the said focal point.

2. An apparatus according to claim 1, more particularly adapted for analyzing a vibration of said reflecting surface, said apparatus further comprising pick-up means for detecting the said vibration, said pick-up means generating a periodic electrical signal, phase-shifting means for applying a progressing phase-shift to said electrical signal, means connecting said phase-shifting means to said transmitting means, for controlling the transmission of said ultrasonic pulsed beam from the phase-shifted electrical signal. and means, connecting said pick-up means to said phase-shifting means for doubling the frequency of said periodic electrical signal and for adjusting said phase-shift so as to obtain the coincidence of the pulses of said ultrasonic pulsed beam with the peak amplitude of the said vibration.

3. An apparatus according to claim 1, more particularly adapted for measuring a small thickness, wherein said transmitting means comprise first second and third transducers, a reference reflector, being located in the plane of the emitting surface of the first transducer, the second and third transducers having their emitting surfaces located in a further plane at a predetermined distance from said reference reflector, the emitting surface of the second transducer being located opposite that of the first transducer, did transmitting means further comprising first, second and third pulse transmitting devices respectively connected at said first, second and third transducers and said receiver means comprising first, second and third echo receivers respectively connected to the first, second third third transducers, the apparatus further comprising means for synchronizing the pulse transmission from the second transmitting device with the echoes received by the first echo receiver, means for synchronizing the pulse transmission by the first transmitting device with the pulse transmission by the third transmitting device and means for measuring the time interval separating the reception of echoes by the second and third echo receivers.

* * * * *